US010953640B2

(12) United States Patent
Ueno et al.

(10) Patent No.: US 10,953,640 B2
(45) Date of Patent: Mar. 23, 2021

(54) THERMOPLASTIC RESIN SHEETS AND FORMED ARTICLES

(71) Applicant: NISSIN FOODS HOLDINGS CO., LTD., Osaka (JP)

(72) Inventors: Tomohiro Ueno, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 64 days.

(21) Appl. No.: 15/029,522

(22) PCT Filed: Oct. 17, 2014

(86) PCT No.: PCT/JP2014/077698
§ 371 (c)(1),
(2) Date: Apr. 14, 2016

(87) PCT Pub. No.: WO2015/056781
PCT Pub. Date: Apr. 23, 2015

(65) Prior Publication Data
US 2016/0263875 A1 Sep. 15, 2016

(30) Foreign Application Priority Data
Oct. 17, 2013 (JP) .............................. JP2013-216168

(51) Int. Cl.
B32B 27/20 (2006.01)
B32B 27/32 (2006.01)
B32B 27/18 (2006.01)
B32B 27/08 (2006.01)
B32B 7/04 (2019.01)
B29K 105/00 (2006.01)

(52) U.S. Cl.
CPC ................ B32B 27/20 (2013.01); B32B 7/04 (2013.01); B32B 27/08 (2013.01); B32B 27/18 (2013.01); B32B 27/32 (2013.01); B29K 2105/0008 (2013.01); B32B 2264/102 (2013.01); B32B 2264/104 (2013.01); B32B 2307/21 (2013.01); B32B 2307/31 (2013.01); B32B 2307/514 (2013.01); B32B 2307/546 (2013.01); B32B 2307/7265 (2013.01); B32B 2307/732 (2013.01); B32B 2439/70 (2013.01)

(58) Field of Classification Search
CPC ........... B32B 27/20; B32B 7/04; B32B 27/08; B32B 27/18; B32B 27/32; B32B 2264/102; B32B 2307/514; B32B 2307/546; B32B 2307/732; B32B 2439/70; B32B 2307/7265; B32B 2307/31; B32B 2307/21; B32B 2264/104; B32B 2307/51; B29C 47/0021; B29C 47/065; B29C 47/0057; B29C 51/14; B29K 2023/16; B29K 2509/00; B29K 2105/16; B29K 2105/256; B29K 2023/12; B29K 2995/001; B29K 2105/0008; B29K 2995/0005; B29K 2995/0093; B29L 2031/712
See application file for complete search history.

(56) References Cited

U.S. PATENT DOCUMENTS

| 5,501,905 | A | * | 3/1996 | Krallmann | .............. B32B 27/32 428/339 |
| 5,891,235 | A | * | 4/1999 | Suzuki | ...................... C08K 3/34 106/483 |
| 6,103,368 | A | * | 8/2000 | Fukuda | ................... B32B 27/06 428/337 |
| 2005/0090588 | A1 | * | 4/2005 | Suzuki | ................ C08K 5/0075 524/147 |
| 2008/0020204 | A1 | * | 1/2008 | Shimane | ................... C08J 5/18 428/343 |
| 2011/0218705 | A1 | | 9/2011 | Ito | |
| 2015/0314554 | A1 | | 11/2015 | Fujiwara et al. | |

FOREIGN PATENT DOCUMENTS

| CN | 104903099 | | 9/2015 |
| JP | 5-229081 A | | 9/1993 |
| JP | 11-293059 A | | 10/1999 |
| JP | 2001-11204 A | | 1/2001 |
| JP | 2001-130529 A | | 5/2001 |
| JP | 2001-164041 A | | 6/2001 |
| JP | 2001316581 A | * | 11/2001 |
| JP | 2003-26874 A | | 1/2003 |
| JP | 2003-82176 A | | 3/2003 |
| JP | 2005-132853 A | | 5/2005 |
| JP | 2006-35832 A | | 2/2006 |
| JP | 2006-83251 A | | 3/2006 |
| JP | 2011-178957 | | 9/2011 |
| WO | 2007/029293 A1 | | 3/2007 |

OTHER PUBLICATIONS

Imaizumi et al. JPH05229081A "Filler-containing synthetic resin sheet" Sep. 7, 1993 (Machine Translation).*
Suzuki, Masahiro, JP-2001316581-A, Nov. 16, 2001 (Machine translation) (Year: 2001).*
Office Action issued in corresponding Chinese patent application, dated Oct. 21, 2016, 9 pages with an English translation.
International Search Report issued in PCT/JP2014/077698, dated Jan. 27, 2015.

* cited by examiner

Primary Examiner — Cheng Yuan Huang
(74) Attorney, Agent, or Firm — Hamre, Schumann, Mueller & Larson, P.C.

(57) ABSTRACT

[Problem] It is intended to provide a formed article for food which has excellent antistatic properties and water repellency without impairing its original external appearance and mechanical properties thereof even in a deep-drawn part having a high drawing ratio at forming or even through high temperature forming.
[Solution] A multi-layer sheet is prepared having a multi-layer configuration with two or more types of two or more layers, including a main layer which contains a thermoplastic resin, talc and white pigment, and a skin layer of an antistatic resin composition which contains at least one type of thermoplastic resin and an antistatic agent on an opposite side. By thermoforming the sheet including the resin composition, a formed article which has excellent antistatic properties and water repellency effective for preventing contamination and adhesion of soup powder can be obtained. The polymer antistatic agent desirably contains a fatty acid ester sulfonate salt as a main component, has a surface resistivity of $10^{13}\Omega/\square$ or less, and has a water droplet contact angle of 90° or more. The multi-layer sheet is desirably prepared by co-extrusion.

10 Claims, No Drawings

THERMOPLASTIC RESIN SHEETS AND FORMED ARTICLES

TECHNICAL FIELD

The present invention relates to a resin sheet and a formed article, particularly to a multi-layer composite made of a thermoplastic resin such as polyolefin, which is a thermoplastic resin sheet and a formed article excellent in interlayer adhesiveness, heat seal strength, compressive strength, rigidity, oil resistance, water repellency, and the like.

BACKGROUND ART

With respect to food containers and the like, there have been problems of nonuniformity of contents and contamination due to charged dust and adhesion of powdered soup and ingredients. Therefore, these products are required to be a container subjected to antistatic treatment. These containers are formed from a conductive resin composition or from an insulating resin followed by applying a conductive coating material to the surface of the containers and are used so that the containers have electrical conductivity to the extent that the containers are not charged with static electricity.

As a conducting agent for the above conductive resin composition or conductive coating material, conductive carbon black is most widely used. However, carbon black has a problem that since it is composed of fine particles, it is easily separated from the surface of a base material, and the separated fine particles of carbon black soil the contents of the container, and a problem that since it is black altogether, the design of the container is poor. Although various types of conductive polymers are proposed as a conductive material that replaces the conductive carbon black, these conductive polymers are expensive and required to be used in a large amount.

Although dissociative inorganic salts such as lithium perchlorate are also proposed as a conductive material that replaces a conductive polymer, these dissociative inorganic salts have low compatibility with a thermoplastic resin forming a container or a film-forming material of a conductive coating material and are hardly uniformly dispersed in the resin or the film. Further, if a dissociative inorganic salt is used in an amount that sufficient electrical conductivity is obtained, the dissociative inorganic salt will be eliminated from a container body or a conductive coating film, and the separated inorganic salt will provide poor practicality similar to the above carbon black.

As a means to solve these defects, a method of adding various surfactants such as anionic, cationic, and nonionic surfactants has been practically used. However, although the method of adding a surfactant provides excellent antistatic properties to a product in a short period of time after the product is formed, it is difficult to maintain the performance over a long period of time because a surfactant bled out to the surface of the product will be lost by friction, water washing, and the like. Further, since a synthetic resin product is formed at high temperatures, part of the surfactant causes thermal decomposition, causing smoke generation during forming, discoloration of the product, and the like. Further, in a multilayer film and resin sheet of a synthetic resin, since it is necessary to add an antistatic agent not only to a surface layer but also to a core layer in order to exhibit antistatic performance, the amount of the antistatic agent added is increased, which is economically disadvantageous.

As an antistatic agent for olefin polymer films, various compounds having a hydroxy group in the molecule have been known, such as fatty acid esters of polyhydric alcohol, polyoxyalkylene alkyl ethers, hydroxyalkyl-substituted aliphatic amines, and hydroxyalkyl-substituted fatty acid amides, and mixture thereof (for example, refer to Patent Literatures 1 and 2). A compound containing nitrogen may generate acrylamide during heating, and a compound which does not contain nitrogen may be poor in antistatic performance. Further, there is known a mixture of the compound having a hydroxy group in the molecule as described above and an organic sulfonic acid salt (for example, refer to Patent Literatures 3 and 4). However, these conventional antistatic agents for olefin polymer films have problems that antistatic properties to be imparted to olefin polymer films are insufficient and nonuniform; slide resistance is insufficient; and especially, antistatic properties and slide resistance imparted to olefin polymer films decrease with time.

Generally, in order to convert plastics from an insulation level to an antistatic level, an antistatic agent having a low molecular weight is applied or kneaded. When an antistatic agent is applied, the application is excellent in immediate effectivity, but the coating film on the surface may be removed by deep draw forming and rubbing of contents. When an antistatic agent is kneaded, even if the coating film on the surface is removed, antistatic properties may be recovered by the bleedout of the antistatic agent. Further, there is a technique of subjecting the peripheral wall of a cup container formed into a cup shape from a synthetic resin containing an antistatic agent to corona discharge treatment to thereby bleed out the antistatic agent to improve surface polarity. However, since this technique has a problem of seal strength between the container and a lid and durability and the polar substance may pollute contents, excessive bleedout is not preferred. (for example, refer to Patent Literature 5)

However, even when an antistatic agent is kneaded, an antistatic effect will be hardly effectively developed in a region (for example, a corner part of a container) where the degree of drawing by thermoforming is large. Particularly, in recent years, the design of a container has been required, and high drawing has been required in each region of a formed article. Therefore, a formed article showing a sufficient antistatic effect even in a region having a high draw ratio and a resin sheet for the same are required.

Further, in the application which should avoid cut wear debris generated from the formed article of a resin sheet, a container formed from a polypropylene-based resin is preferably used. However, in the polypropylene-based resin, crystal structure easily changes with forming conditions, and the speed of development of antistatic properties is influenced by the change. For example, the development of antistatic properties is early on the surface in contact with a mold because the surface is rapidly cooled, but the development of antistatic properties is late on the opposite surface because it is slowly cooled.

Since the number of trapped free electrons in the polypropylene-based resin itself is different due to the difference in crystallization depending on a homopolymer or a random copolymer or the addition of a rubber component, a co-block polymer is used (for example, refer to Patent Literature 6). However, there is a problem that the rigidity of a formed article may be insufficient.

Further, water repellency may be required for a resin sheet and a formed article. For example, when water is used for cooking, the water adheres to a container because an ionic dissociation type antistatic agent used in a conventional container is hydrophilic. Therefore, it has been difficult to obtain clear water supply amounts. Thus, water repellency has been imparted by incorporating inorganic fine particles into the surface of a resin sheet (for example, refer to Patent Literature 7). However, in this method, the inorganic fine particles may peel off or may be decomposed to be eluted into water. Therefore, the method has not been able to be employed in a material in which incorporation of impurities is not allowed, such as a food container.

CITATION LIST

Patent Literature

Patent Literature 1: Japanese Patent Laid-Open No. 2001-11204
Patent Literature 2: Japanese Patent Laid-Open No. 2003-82176
Patent Literature 3: Japanese Patent Laid-Open No. 2001-164041
Patent Literature 4: Japanese Patent Laid-Open No. 2005-132853
Patent Literature 5: Japanese Patent Laid-Open No. 2001-130529
Patent Literature 6: Japanese Patent Laid-Open No. 2006-83251
Patent Literature 7: Domestic Re-publication of PCT International Application No. 2007-029293

SUMMARY OF INVENTION

Technical Problem

Thus, an object of the present invention is to provide a thermoplastic resin sheet having water repellency in which, in a formed article, high antistatic properties can be imparted even to a surface not in contact with a mold and a deep-drawn part having a high drawing ratio in the same manner as imparted to a surface in contact with a mold, and to provide a formed article formed from the resin sheet.

Solution to Problem

As a result of extensive and intensive studies, the present inventors have found a thermoplastic resin composition that can impart excellent antistatic properties even to a surface not in contact with a mold and a drawn part in the same manner as imparted to a surface in contact with a mold, in a formed article, and can impart water repellency to a surface generally having hydrophilicity to which an antistatic agent is added. The present invention has been completed based on this finding.

Specifically, the present invention provides a thermoplastic resin sheet comprising a multilayer of two or more layers comprising a skin layer and a main layer, wherein the skin layer comprises a thermoplastic resin and an antistatic agent; the main layer comprises a thermoplastic resin and an inorganic additive; the thickness of the skin layer is equal to or less than a predetermined length; and when the thermoplastic resin sheet is stretched, water repellency of the skin layer increases, and provides a formed article obtained by thermoforming the thermoplastic resin sheet.

Further, the thickness of the skin layer is desirably 10 μm or more and 50 μm or less, and when the thermoplastic resin sheet is stretched, a water droplet contact angle in the skin layer is desirably 90° or more.

Further, the surface resistivity of the skin layer is desirably $9\times10^{13}\Omega$ or less.

Further, the thermoplastic resin contained in the skin layer and the main layer is desirably a polyolefinic polymer.

Further, the antistatic agent desirably comprises a sulfonate salt as a substantial component.

Further, the average particle size of the inorganic additive is desirably 20 μm or less.

Advantageous Effects of Invention

When the antistatic resin composition of the present invention is used, there is obtained, in forming, a formed article having excellent antistatic properties even on a surface not in contact with a mold and in a deep-drawn part having a high drawing ratio in the same manner as on a surface in contact with a mold. Further, high antistatic properties can be maintained even after stretching or orientation, and antistatic properties can be uniformly imparted to the whole formed article. Further, since projections are formed on a skin layer, both water repellency and antistatic properties have been exhibited, which has not been obtained by conventional antistatic materials. Further, since the resin sheet of the present invention has high antistatic properties and water repellency, it is useful as a transportation container for semiconductors and electronic components, a chemical container, a container for food, and an exterior and interior sheathing material.

DESCRIPTION OF EMBODIMENTS

Thermoplastic Resin

A polyolefinic polymer is, for example, used as a thermoplastic resin in the present invention. Among the polyolefinic polymer, a polypropylene-based polymer is particularly desirable in terms of rigidity and heat resistance.

A crystalline polypropylene-based polymer used in the present invention may be a homopolymer of propylene (polypropylene), a binary or more block, random, or graft copolymer between more than half weight of propylene and other α-olefins (such as ethylene, 1-butene, 1-pentene, 1-hexene, 4-methyl-1-pentene, and 1-octene), a vinyl ester (for example, vinyl acetate), an aromatic vinyl monomer (for example, styrene), a vinylsilane (for example, vinyltrimethoxysilane and vinyltrimethylsilane), or the like, or a mixture thereof.

It is possible to use a homopolymer or a copolymer properly depending on applications. A polymer having a propylene content of about 90 to 100 mol %, for example, a propylene homopolymer, can be used in terms of rigidity of a formed article, and a copolymer can be used in terms of antistatic properties.

The form of a copolymer may be a block copolymer or a random copolymer. Note that a block copolymer has a low modulus of elasticity, and when it is formed into a sheet, rigidity and toughness tend to be reduced. Therefore, the whole polypropylene-based resin is preferably a non-block copolymer.

The polypropylene-based resin may be an atactic polymer. Examples of the stereoregularity of the polypropylene-based resin include, but are not particularly limited to, an isotactic structure, a syndiotactic structure, and a metallocene structure formed from a metallocene catalyst. Among these, a polypropylene-based resin having an isotactic structure which has been conventionally widely used is preferred in terms of simpleness and economical efficiency.

Further, a propylene-ethylene random copolymer containing a crystalline polypropylene part and an ethylene-propylene random copolymer part and a propylene-ethylene block copolymer are preferred in terms of antistatic properties, surface blush resistance, processability, and properties balance, and the propylene-ethylene block copolymer is especially preferred.

The propylene-ethylene block copolymer comprises a crystalline polypropylene homopolymer part in an amount of 30 to 100% by weight, preferably 35 to 95% by weight, particularly preferably 40 to 90% by weight and an ethylene-propylene random copolymer part having a weight average molecular weight (Mw) of 200,000 to 1,200,000, preferably 220,000 to 1,000,000, particularly preferably 250,000 to 800,000 in an amount of 0 to 70% by weight, preferably 5 to 65% by weight, particularly preferably 10 to 60% by weight. Here, if the content of a crystalline polypropylene homopolymer part having a weight average molecular weight of 50,000 to 500,000 is less than the above range, rigidity will be insufficient, and on the other hand, if the content is more than the above range, impact strength will be insufficient. If the content of the above ethylene-propylene random copolymer part is less than the above range, impact strength will be insufficient, and on the other hand, if the content is more than the above range, rigidity will be insufficient. If the weight average molecular weight (Mw) is larger than the above range, processability will be reduced, and if it is smaller than the above range, impact strength will be reduced.

Further, the polypropylene-based resin may be used singly or in combination.

Further, a masterbatch comprising a polyethylene-based resin may be contained for the convenience of adding a filler, a pigment, and the like.

As the polyethylene-based resin, a low density polyethylene (LDPE) or a linear low density polyethylene (LLDPE) is preferred, and a linear low density polyethylene is particularly preferred.

When a linear low density polyethylene is used, antistatic properties on a stretched part (oriented part), particularly antistatic properties on a region having a high drawing ratio in a formed article, can be developed early, or the effect of the antistatic properties in these regions can be increased. Further, antistatic properties can be developed early even on a part not in contact with a mold in the same manner as on a part in contact with a mold, and the difference in the antistatic properties of the surface and those of the back surface in a form can be reduced. Further, when a linear low density polyethylene is used, the linear low density polyethylene will easily form a continuous phase at least in the vicinity of a sheet surface (for example, from a sheet surface to a depth of 5 μm). That is, when a linear low density polyethylene is used, the linear low density polyethylene and polypropylene will form a bicontinuous structure (network structure) in the vicinity of a sheet surface. It seems that, in the inner part of the sheet, a sea-island structure is formed in which polypropylene is a matrix and a linear low density polyethylene is a disperse phase.

A linear low density polyethylene is a polyethylene having a small number of branched chains obtained by a low pressure polymerization method and is a copolymer of ethylene and α-olefin. Specific examples of the α-olefin include α-olefins other than ethylene, for example, α-C3 to C12 olefins such as propylene, 1-butene, 1-pentene, 1-hexene, 1-heptene, 1-octene, and 4-methyl-1-pentene. Among these α-olefins, α-C 3 to C10 olefins are preferred; α-C3 to C8 olefins are more preferred; and linear α-C5 to C8 olefins (such as 1-hexene and 1-octene) are further preferred. These α-olefins may be used singly or in combination.

The melt index (MI) of the polypropylene-based resin is about 0.1 to 10 g/10 min, preferably about 0.2 to 10 g/min, further preferably about 0.4 to 3 g/10 min. If the melt index MI is too high, modulus of elasticity and rigidity will be reduced; drawdown will tend to occur during thermoforming; and forming will be difficult. Further, the thickness of a formed article will be nonuniform, and wrinkles will be caused. If the melt index MI is too low, seal adhesiveness will be improved, but extrusion will be difficult.

[Antistatic Agent]

A resin composition excellent in antistatic properties is obtained by combining the thermoplastic resin with an antistatic agent. Examples of the antistatic agent include antistatic agents such as nonionic antistatic agents, anionic antistatic agents, cationic antistatic agents, and amphoteric antistatic agents.

Examples of the nonionic antistatic agents include polyhydric alcohol fatty acid ester, polyoxyethylene alkyl ether, polyoxyethylene alkyl phenyl ether [for example, polyoxyethylene (having an average addition molar number of the oxyethylene group of 1 to 30)], N,N-bis(2-hydroxyethyl)alkylamine (so called alkyl diethanolamine), polyoxyethylene alkylamine, N,N-bis(2-hydroxyethyl)fatty acid amide, polyoxyethylene alkylamine fatty acid ester, alkyl diethanolamide, and polyoxyethylene alkylamide.

Examples of the anionic antistatic agents include alkyl sulfonate salts [such as C6-C24 alkyl sulfonate salts (particularly, C8-C18 alkyl sulfonate salts)], alkylbenzenesulfonate salts, alkyl diphenyl ether disulfonate salts, alkyl sulfate salts, alkyl sulfonate phosphonium salts, and alkyl phosphates. Examples of the salts include salts with ammonia, an amine, an alkali metal (for example, sodium), and an alkaline earth metal.

Examples of the cationic antistatic agents include tetraalkylammonium salts and trialkylbenzylammonium salts. Examples of the salts include salts with a halogen atom (for example, a chlorine atom and a bromine atom) and perchloric acid.

Examples of the amphoteric antistatic agents include alkyl betaine, alkylimidazolium betaine, and hydroxyalkyl imidazoline sulfate.

Among these antistatic agents, an anionic antistatic agent, particularly composed mainly of glycerin fatty acid ester sulfonate, is widely used in terms of compatibility with a polyolefinic resin, the price, and heat stability. Since nitrogen or the like is not contained, it is preferred when safety and a high antistatic effect are required.

These antistatic agents may be used singly or in combination.

Here, the antistatic agent for synthetic polymer materials according to the present invention (hereinafter, simply referred to as "the antistatic agent of the present invention") will be described. The antistatic agent of the present invention is an antistatic agent comprising a sulfonate salt as a substantial component. Here, "comprising a sulfonate salt as a substantial component" means that the antistatic agent contains a sulfonate salt in an amount in the range of generally 90% by weight or more and less than 100% by weight, preferably 95% by weight or more and less than 100% by weight, more preferably 97% by weight or more and less than 100% by weight.

Further, examples of the sulfonate salt include monoalkyl sulfate salts, alkyl polyoxyethylene sulfate salts, and alkylbenzenesulfonate salts. Especially, examples include a sulfonate salt having, in a molecular skeleton, a glycerin fatty acid ester compound having a C1 to C40 aliphatic hydrocarbon group. Especially, a glycerin fatty acid ester compound having a C3 to C40 aliphatic hydrocarbon group is preferred, and a glycerin fatty acid ester compound having a C6 to C35 aliphatic hydrocarbon group is more preferred.

The antistatic agent of the present invention is an antistatic agent comprising a sulfonate salt as a substantial component, which also comprises a specific metal ion in a concentration of 0.1 to 1000 ppm, preferably 0.5 to 500 ppm. Here, the specific metal ion means one or two or more selected from alkali metal ions and alkaline earth metal ions, and when two or more metal ions are selected, the concentration means the total of these metal ions (hereinafter simply referred to as "metal ions"). Examples of these alkali metal ions include lithium ions, sodium ions, potassium ions, rubidium ions, cesium ions, and francium ions. Further, examples of the alkaline earth metal ions include beryllium ions, magnesium ions, calcium ions, strontium ions, barium ions, and radium ions. Among them, alkali metal ions are preferred, and sodium ions and/or potassium ions are more preferred. Further, the antistatic agent of the present invention may also comprise a sulfonate phosphonium salt having a C1 to C18 aliphatic hydrocarbon group or an aromatic hydrocarbon group in a side chain.

As described above, the antistatic agent of the present invention is an antistatic agent comprising a sodium sulfonate salt as a substantial component and also comprises a metal ion in a concentration of 0.1 to 500 ppm, preferably 0.5 to 300 ppm. Further, the antistatic agent of the present invention preferably has a pH in a specific condition of 4.5 to 7.5, particularly preferably 5.5 to 7.0. Here, the pH in a specific condition means a pH value obtained by measuring, using a glass electrode at a solution temperature of 25° C., the pH of a 1% by weight solution of the antistatic agent of the present invention prepared using a mixed solution of water/methanol=50/50 (weight ratio) as a dilution.

Finally, a composition of a skin layer constituting the thermoplastic resin sheet according to the present invention will be described. The details of the skin layer will be described later. The composition of the skin layer contains the antistatic agent of the present invention described above in a proportion of 0.01 to 5.0 parts by weight, preferably 0.05 to 3.0 parts by weight, more preferably 0.2 to 1.5 parts by weight, per 100 parts by weight of a synthetic polymer material. For preparing such a composition of a skin layer, there is employed 1) a method of adding the antistatic agent of the present invention in the polymerization step of a synthetic polymer material, or 2) a method of adding the antistatic agent of the present invention during the processing of a synthetic polymer material, or the like.

The weight average molecular weight of the antistatic agent is about 4000 or less, preferably about 150 to 3000, more preferably about 200 to 2000.

Note that the optimum range of the content of the antistatic agent changes depending on the type of each component and cannot be determined unconditionally; if the content of the antistatic agent is too high, the physical properties of the resin composition will be reduced, the surface will be sticky, and seal strength will be reduced to cause contamination; and if the content of the antistatic agent is too low, the antistatic effect will be not sufficient.

[Other Additives]

For the purpose of adjusting the antistatic effect, a high-molecular antistatic agent, a metal oxide, carbon black, an electrical conductivity-imparting agent, higher alcohol, and the like may be added to the thermoplastic resin of the present invention. Further, a die build-up prevention agent, a coloring agent, a dispersant, a release agent, a stabilizing agent (such as an antioxidant, an ultraviolet absorber, and a heat stabilization agent), a flame retardant, a lubricant, an anti-blocking agent, a filler, and the like may be added as needed.

[Inorganic Additives]

Examples of inorganic additives include talc, mica, carbon black, silica, dolomite powder, silicate, quartz powder, diatomaceous earth, alumina, aluminum hydroxide, magnesium hydroxide, and calcium carbonate, in terms of cost reduction by reducing the amount of a resin used, fire resistant properties, and mechanical properties such as rigidity and impact resistance. With respect to the chemical formula, a compound essentially comprising $Mg_3Si_4O_{10}(OH)_2$ is preferred. The average particle size is about 20 μm or less, preferably about 1.0 to 18 μm, more preferably about 2.5 to 15 μm, which is preferred in terms of forming water repellent unevenness on the bulk surface to improve water repellency, and the like.

Further, since addition of inorganic additives directly to an extruder is difficult in terms of dispersibility and preventing torque increase, inorganic additives were previously formed into a masterbatch to cope with the difficulty. At this time, 150% by weight of inorganic additives is desirably added to 100% by weight of a polyethylene-based resin in terms of productivity and cost.

[White Pigment]

Examples of white pigment include zinc white, lead white, lithopone, titanium oxide, precipitated barium sulfate, and baryta powder. However, in food applications, white pigment is limited to a food additive. Examples of titanium oxide as a white pigment which is a food additive conforming to the Food Sanitation Law include high purity titanium oxide having a purity of 99% or more. Titanium oxide as a white pigment is the best for food applications in terms of health, health supervision, and impression of food. With respect to the chemical formula, titanium oxide essentially comprising $TiO_2$ is preferred. The average particle size is about 1 μm or less, preferably about 0.01 to 0.8 μm or less, more preferably about 0.05 to 0.3 μm, which is preferred in terms of improving the light shielding performance of a bulk, and the like. Since the shielding properties will not be increased much when the amount of the white pigment added is increased to some extent, it is preferred to determine the amount on balance with cost.

Further, since addition of the white pigment directly to an extruder is difficult in terms of dispersibility and preventing torque increase, the white pigment was previously formed into a masterbatch to cope with the difficulty. At this time, 150% by weight of the white pigment is desirably added to 100% by weight of a polyethylene-based resin in terms of productivity and cost.

[Details of Thermoplastic Resin Sheet]

The thermoplastic resin sheet of the present invention is a multi-layer sheet comprising a plurality of layers. The thickness of the whole thermoplastic resin sheet is about 0.1 to 3.0 mm, preferably about 0.2 to 2.0 mm, more preferably about 0.5 to 1.2 mm.

In the thermoplastic resin sheet of the present invention, at least one of the outermost layers comprises a skin layer. The thermoplastic resin sheet of the present invention can be prepared by a method such as co-extrusion, heat lamination, or dry lamination, in which adhesives are not necessarily required. Note that, the amount of an expensive antistatic agent used can be reduced by constituting a surface layer by a skin layer and forming an intermediate layer which does not contain an antistatic agent.

A method for producing the thermoplastic resin sheet of the present invention is not particularly limited, but pellets of the above resin composition are fed to a conventional extruder, melt kneaded, and extruded from a die [such as a flat die, a T-shaped die (T-die), and a cylindrical die (circular die)] into a sheet shape. At this time, the sheet constitution has desirably two types of two layers or two types of three layers. Compounding is performed such that a skin layer forming the outermost layer contains a thermoplastic resin and an antistatic agent, and a main layer forming other layers (for example, intermediate layer) contains a thermoplastic resin and an inorganic additive. Note that the compounding may be performed such that the main layer further contains white pigment.

Further, the thickness of the skin layer is about 10 to 50 µm, preferably about 12 to 40 µm, more preferably about 15 to 35 µm, in order to form a projection shape in the skin layer after forming. The thickness of the main layer is about 0.02 to 5.0 mm, preferably about 0.05 to 3.0 mm, more preferably about 0.1 to 2.0 mm. With respect to the formation of projections, the projection shape is probably formed from the difference in cooling shrinkage of a resin caused by an inorganic additive which is compounded into the main layer and acts as a nucleus. The projection shape may be formed also by transfer of the emboss shape of a roll, shrinkage difference between two or more types of resins, or sea-island phase separation by means of spinodal decomposition.

Although the resin sheet may be stretched (such as uniaxial stretching and biaxial stretching), it is generally an unstretched sheet which has been drawn (taken up) in the direction of extrusion. Note that in the sheet forming, the extruded sheet can generally be cooled with a cooling roll (chilled roll) and wound up. In such sheet forming, even if one surface of the resin sheet is cooled, the antistatic properties on both surfaces of the sheet can be improved. The melting temperature is about 150 to 250° C., preferably about 200) to 240° C. One or both surfaces of the resulting resin sheet may further be coated with an electrical conductivity-imparting agent such as an antistatic agent, carbon black, and a metal oxide, a release agent, and the like.

[Formed Piece]

The polyolefinic resin sheet of the present invention can be subjected to forming by conventional thermoforming, such as free blowing, vacuum forming, bending, pressure forming, matched mold forming, and hot plate forming. Examples of formed pieces include a material for packaging, a container for food, a container for chemicals, a tray, an embossed tape, and a carrier tape.

In the resin composition and sheet of the present invention, the antistatic properties not only on a surface not in contact with a mold but also in a thermoformed region in which stretching and orientation occur can be largely improved. More specifically, when a female housing is thermoformed, not a small amount of antistatic agent on the bottom wall and the internal and external surfaces of the female housing having a thermal effect will bleed out. Therefore, antistatic properties can be developed at an early stage and can be sustained.

The surface of a sheet or a formed piece may be subjected to surface treatment (such as electro-discharge treatment such as corona discharge and glow discharge, acid treatment, and flame treatment). Further, the shape of additives in the main layer is transferred to the skin layer by high deep drawing or stretching, which is useful for improving water repellency.

As described above, the thermoplastic resin sheet according to the present invention has the effect that excellent antistatic properties can be imparted to a synthetic polymer material without impairing its original hue and transparency.

Further, since an antistatic agent can be efficiently added only to the surface by forming a skin layer, the thermoplastic resin sheet according to the present invention has the effect that production cost can be reduced. Further, the thermoplastic resin sheet according to the present invention has the effect that projections are formed on the surface during thermoforming, and the strength of a formed article is improved, by reducing the thickness of the skin layer and adding an inorganic additive to the main layer. The composition of the skin layer of the present invention has excellent antistatic properties while maintaining the original hue and transparency of a synthetic polymer material, and the main layer has the effect of considerably contributing to the formation of projections and improvement in rigidity.

The formed article according to the present invention is excellent in antistatic properties, rigidity, impact properties, and water repellency, and when it is used, for example, as a container for instant noodles or instant food, adhesion of the contents to the cup wall surface by electrostatic charge will be suppressed. Further, since the container has water repellency, water level can be clearly grasped.

EXAMPLES

Hereinafter, the present invention will be described in more detail with reference to Examples, but the present invention is not limited to these Examples. Note that the evaluation methods of each evaluation item and the contents of each component used in Examples are as follows.

[Melt Index (MI, unit: g/10 min)]

The melt index MI was measured in accordance with the method specified in JIS K7210. Measurement temperature is 230° C., and the test load is set to 21.18 N.

[Weight Ratio X (% by Weight) of the Propylene-Ethylene Random Copolymer Part to all the Block Copolymers in a Propylene-Ethylene Block Copolymer]

The weight ratio X (% by weight) of the propylene-ethylene random copolymer part to all the block copolymers in a propylene-ethylene block copolymer was calculated from the following formula by measuring each heat of crystal fusion of a propylene homopolymer part and all the block copolymers.

$$X = 1 - (\Delta Hf)T/(\Delta Hf)P$$

(ΔHf)T: Heat of fusion of the whole block copolymer (cal/g)

(ΔHf)P: Heat of fusion of a propylene homopolymer part (cal/g)

[Inorganic Particle Additives, Measurement of Particle Size]

Particles are measured using a laser diffraction/scattering particle size distribution analyzer in the state of powder in advance before the particles are mixed. As the measurement instrument, for example, model LA-920 manufactured by Horiba, Ltd. is preferred because it is excellent in the accuracy of measurement.

[Thickness of Sheet Constitution]

The cross section of a sheet was shaved with a feather blade, and the thickness of a skin layer and a main layer was measured based on the presence or absence of particles using an optical microscope AZ100M manufactured by NIKON, Inc.

[Antistatic Performance 1 (Surface Resistivity Ω/□)]

An extruded sheet was cured for 2 to 7 days at a temperature of 20° C. and a humidity RH of 50% and measured for the surface specific resistance value according to JIS K6911.

"Loresta GP" MCP-T600 manufactured by Mitsubishi Chemical Corporation and "Hiresta UP" electrode UR-100 probe manufactured by Mitsubishi Chemical Corporation were used as measurement devices. A sample was installed in an atmosphere of 23° C./50% RH, to which was applied a voltage of 500 V, and the surface intrinsic resistivity after charging for 1 minute (voltage applying time: 1 min) was measured. Note that the value of the surface intrinsic resistivity is represented by $\Omega/\square$.

The extruded sheets were evaluated according to the following criteria: a surface intrinsic resistivity of $1.0 \times 10^{16} \Omega/\square$ or less is rated as Fair; preferably, a surface intrinsic resistivity of $1.0 \times 10^{14}$ to $1.0 \times 10^{8} \Omega/\square$ is rated as Good; and more preferably, a surface intrinsic resistivity of $1.0 \times 10^{12}$ to $1.0 \times 10^{9} \Omega/\square$ is rated as Excellent, which is excellent in the antistatic effect and the restoring force of antistatic ability.

[Antistatic Performance 2 (Static Voltage Decay Half-Life)]

A formed article formed from an extruded sheet was charged, one day after forming, for 2 minutes at 10 kv using a STATIC HONESTMETER (manufactured by SHISHIDO ELECTROSTATIC, LTD.), and the half-life after stopping the charging was measured. The value of the static voltage decay half-life is represented by second (SEC). The smaller the value (SEC) is, the more excellent is the antistatic properties in the case of a high charge amount.

[Water Repellency (Water Droplet Contact Angle)]

The water droplet contact angle between a sample film and pure water was measured 10 times in accordance with JIS-R3257 (1999) using DropMaster500 manufactured by Kyowa Interface Science Co., Ltd., and the average value thereof was defined as a water droplet contact angle, the value being represented by an angle (°). Note that, in the measurement, a water droplet was dropped on the measuring surface of a sample film in an atmosphere of 20±2° C. and 65±5% RH, and then the angle of the water droplet to the surface was read after one minute. The lower the water droplet contact angle is, the higher the hydrophilicity is; and the higher the water droplet contact angle is, the higher the water repellency is.

[Sealing Strength]

A formed resin sheet is subjected to vacuum pressure forming within 3 to 30 days after the forming to obtain a rectangular parallelepiped container (having a flange seal width of 5 mm). A polyethylene resin (30 μm) is laminated to a cardboard sheet (80 g/m2) to obtain a substrate. The flange of the formed container and the substrate are sandwiched with an aluminum mold from both sides under the conditions of a temperature of 210 (° C.), a pressure of 1000 (N), and a pressure holding time of 0.7 (SEC) to seal the container with the substrate, followed by cooling to ordinary temperature. Subsequently, the container sealed with the substrate is annealed for one week at 40° C. and 75% RH and cooled to ordinary temperature for one hour, and then the substrate is peeled from a corner of the rectangular parallelepiped in the direction of 90 degrees at a stress rate of 300 mm/min using a tensile testing machine. The resulting maximum peeling strength is defined as a Sealing Strength, the value thereof being given in Newton (N). The Sealing Strength is an index of airtightness between a container and a lid, and the initial strength is desirably about 20 N, at least about 15 N. If the Sealing Strength is significantly reduced with time, the seal will be peeled during transportation, which is not preferred in practical use.

[Antistatic Performance 3 (Evaluation with Formed Article and Powdered Soup)]

A formed resin sheet was subjected to vacuum pressure forming within 3 to 14 days after the forming to obtain a rectangular parallelepiped cup. After weighing 5 g of HONDASHI manufactured by AJINOMOTO CO., INC. into the cup, the cup was internally filled with HONDASHI and sealed. The cup is reciprocated 20 times in a width of 20 cm on a plastic plate to stir the inside of the cup. After stirring, the cup is vertically inverted to drop the internal filler, which is then weighed.

Adhesion weight was defined by "initial weight"–"dropped weight"="adhesion weight", and the results of the adhesion weight were classified as follows.

Excellent: 0.01 g or less, very good.
Good: 0.05 g or less and 0.01 g or more, almost good.
Poor: 0.05 g or more, not preferred.

[Total]

The total evaluation of each measurement item was classified as follows.

Excellent: No problem. Having sufficient performance in measurement items.
Good: No problem in practical use.
Fair: Having a problem in use.
Poor: Impossible to use.

[Contents of Each Component]

Production of a Thermoplastic Resin Sheet: PP (A-1), PP (A-2), PP (A-3)

A propylene homopolymer and an ethylene-propylene block copolymer shown in Table 1 were used. The block copolymer comprising a propylene homopolymer and a propylene-ethylene copolymer having a weight average molecular weight of 380,000 was produced by a gas phase polymerization process using a Ziegler type catalyst, which was pelletized and used by a method of adding it during sheet production.

TABLE 1

| Polypropylene type | MI | Homopolymer polypropylene Content (% by mass) | Random copolymer polypropylene Content (% by mass) | Ethylene-propylene copolymer Content (% by mass) | Ethylene-propylene copolymer Ethylene content (% by mass) |
|---|---|---|---|---|---|
| PP(A-1) | 1.9 | 100 | 0 | 0 | 0 |
| PP(A-2) | 2.3 | 0 | 100 | 0 | 0 |
| PP(A-3) | 2.5 | 95 | 0 | 5 | 30 |

[Production of Antistatic Agent]

Sodium sulfonate salt was used as the main component of an antistatic agent, and 18% by weight of the antistatic agent and 3% by weight of spherical silica as an anti-blocking agent were mixed with PP (A-2) in a blender followed by kneading through extrusion followed by pelletizing. Thus, a masterbatch in which the antistatic component was concentrated to a high concentration was prepared, which was used by a method of adding it during sheet production.

[Production of Inorganic Additive]

The main component of an inorganic additive is talc, which is represented by the chemical formula $Mg_3Si_4O_{10}(OH)_2$. Talc having an average particle size of 15.0 μm was used, where the particle size was measured using model LA-920 manufactured by Horiba, Ltd. In a blender, 60% by weight of the talc was mixed with a linear low density polyethylene [Evolue (registered trademark SP3010) manufactured by Mitsui Chemicals, Inc., density (JIS K7112)=0.925 g/cc$^3$, MI=0.9/10 min] followed by kneading through extrusion followed by pelletizing. Thus, a masterbatch in which the talc component was concentrated to a high concentration was prepared, which was used by a method of adding it during sheet production as an inorganic additive.

[Production of White Pigment]

The main component of a white pigment is titanium oxide, which is represented by the chemical formula $TiO_2$. Titanium oxide having an average particle size of 15.0 μm was used, where the particle size was measured using model LA-920 manufactured by Horiba, Ltd. In a blender, 60% by weight of the white pigment was mixed with a linear low density polyethylene [Evolue (registered trademark SP3010) manufactured by Mitsui Chemicals, Inc., density (JS K7112)=0.925 g/cc$^3$, MI=0.9/10 min] followed by kneading through extrusion followed by pelletizing. Thus, a masterbatch in which the white pigment component was concentrated to a high concentration was prepared, which was used by a method of adding it during sheet production as a white pigment.

[Production of Sheet]

Table 2 shows the compounding ratios and the thickness of the sheet constitution, in which "PP" means polypropylene. The "PP" and "antistatic agent" were previously mixed in a Henschel mixer, and the mixture was charged into an extruder that feeds the mixture to the skin layer side. The "inorganic additive" was dried at 80° C. for about 3 hours. The "PP" and "white pigment" were previously mixed in a Henschel mixer, and the mixture was charged into an extruder that feeds the mixture to the main layer side. A single screw extruder having a screw diameter of 135 mm and a screw length of 4500 mm was used as the extruder for the skin layer side, and a single screw extruder having a screw diameter of 50 mm and a screw length of 2835 mm was used as the extruder for the main layer side. After melt kneading the raw materials at an extruder cylinder temperature of 240° C., the skin layer raw material was fed to the outer layer of a multi-feed block with a multi-layer T-die, and the main layer raw material was fed to the inner layer of the multi-layer die (opposite surface of a cooling roll), thus having co-extruded a multi-layer sheet having two types of two layers which form a skin layer/main layer constitution. The sheet shape was formed by casting a sheet at a die temperature of 230° C. and then rapidly cooling and solidifying the sheet so that the main layer contacts the cooling roll at a temperature of 35° C. The ratio of the thickness of the skin/main layer components was controlled by the ratio of the amounts extruded, and the die pressure was controlled and adjusted so that the die pressure might be maintained at a constant pressure with a gear pump. The thickness deviation in the TD direction was controlled by a heat bolt method and adjusted so that the thickness might be within ±8% of the central thickness. This sheet like object was cooled with a cooling roll to produce a sheet having a width of 650 mm and a thickness of 0.9 mm. The air gap was set to 1.1 mm, and the take-over speed was set to 12.0 m/min, so that the total thickness of the sheet taken over might be adjusted to 0.9 mm. After the sheeting, the sheet was conditioned for 24 hours or more in the state of constant temperature and humidity (at a temperature of 23±2° C. and a humidity of 50±5%), and then the antistatic performance of the resulting sheet was measured. The details of the results of measurement are as shown in Table 3.

[Production of Formed Article]

The sheet prepared according to the method shown above was processed into a formed article using a vacuum pressure forming machine FVS-500 manufactured by WAKISAKA ENGINEERING Co., Ltd. Specifically, the sheet obtained as described above was fixed to a square stainless steel frame having a dimension of about 650 mm×650 mm, then heated for 20 seconds with a far-infrared heater (temperature setting: 550° C.), and vacuum-sucked with a rotary pump simultaneously with the insertion of a male plug into a female mold to form a cup sample (dimension: a longer outer side of 130 mm×a shorter outer side of 120 mm×a height of 95 mm, a longer inner side of 115 mm×a shorter inner side of 105 mm, a flange width at one side of 7.5 mm, wall surface thickness: 0.2 to 0.3 mm, a rectangular container). The formed cup sample was conditioned for 24 hours or more in the state of constant temperature and humidity (at a temperature of 23±2° C. and a humidity of 50±5%), and a part of the conditioned cup sample was cut out to measure water repellency, antistatic properties, and seal. The details of the results of measurement are as shown in Table 3.

TABLE 2

| | Sheet constitution | | | | | | | |
|---|---|---|---|---|---|---|---|---|
| | Skin layer | | | | | Main layer | | |
| Test number | PP (A-1)/% | PP (A-2)/% | PP (A-3)/% | Antistatic agent/% | Thickness/ μm | PP (A-1) | Inorganic additive/% | White pigment/% | Thickness/ μm |
| Example 1 | 95 | 0 | 0 | 5 | 30 | 51 | 40 | 9 | 870 |
| Example 2 | 0 | 95 | 0 | 5 | 30 | 51 | 40 | 9 | 870 |
| Example 3 | 0 | 0 | 95 | 5 | 30 | 51 | 40 | 9 | 870 |
| Comparative Example 1 | 85 | 0 | 0 | 15 | 30 | 51 | 40 | 9 | 870 |
| Comparative Example 2 | 98 | 0 | 0 | 2 | 30 | 51 | 40 | 9 | 870 |
| Comparative Example 3 | 95 | 0 | 0 | 5 | 9 | 51 | 40 | 9 | 891 |
| Comparative Example 4 | 95 | 0 | 0 | 5 | 100 | 51 | 40 | 9 | 800 |

TABLE 3

| | Sheet evaluation Antistatic performance | | Water | Antistatic performance 3 | | |
|---|---|---|---|---|---|---|
| | | | | | | Formed article evaluation |
| Test number | Surface resistivity Ω/□ | Static voltage delay half-life/ Sec | repellency Water droplet contact angle/° | Seal Adhesive strength/N | Amount of adhesion of powdered soup | Overall evaluation Total |
| Example 1 | 10^13 | 80 | 100 | 20 | Good | Good |
| Example 2 | 10^13 | 75 | 100 | 18 | Good | Good |
| Example 3 | 10^12 | 70 | 100 | 20 | Excellent | Excellent |
| Comparative Example 1 | 10^11 | 60 | 100 | 13 | Excellent | Fair |
| Comparative Example 2 | 10^15 | 140 | 100 | 22 | Poor | Poor |
| Comparative Example 3 | 10^13 | 150 | 110 | 20 | Poor | Poor |
| Comparative Example 4 | 10^13 | 60 | 70 | 20 | Good | Poor |

The present application is based on Japanese Patent Application No. 2013-216168 filed on Oct. 17, 2013, the contents of which are incorporated herein by reference.

The invention claimed is:

1. A thermoplastic resin sheet that is configured to form a deep-drawn formed article consisting of the thermoplastic resin sheet by thermoforming the thermoplastic resin sheet, wherein the thermoplastic resin sheet consists of two layers, the two layers are a skin layer and a main layer, the skin layer comprises:
a thermoplastic resin; and
an antistatic agent comprising 90% by weight or more and less than 100% by weight of a sulfonate salt, the main layer comprises:
a thermoplastic resin; and
an inorganic additive having an average particle size in a range of 20 μm or less, a thickness of the thermoplastic resin sheet is in a range from 0.1 mm to 3.0 mm,
the thickness of the skin layer is in a range from 15 to 35 μm,
each of the thermoplastic resin in the skin layer and the thermoplastic resin in the main layer is a polyolefinic polymer, and
when the thermoplastic resin sheet is deep-drawn stretched by thermoforming, the inorganic additive contained in the main layer forms a projection shape on a surface of the skin layer so as to increase water repellency of the skin layer.

2. The thermoplastic resin sheet according to claim 1, wherein a contact angle of a water droplet on the skin layer is in a range of 90° or more when the thermoplastic resin sheet is deep-drawn by the thermoforming.

3. The thermoplastic resin sheet according to claim 1, wherein surface resistivity of the skin layer is in a range of $9 \times 10^{13} \Omega$ or less.

4. A deep-drawn formed article consisting of a thermoplastic resin sheet,
wherein the deep-drawn formed article is obtained by thermoforming the thermoplastic resin sheet, and
wherein the thermoplastic resin sheet consists of two layers, the two layers being a skin layer and a main layer,
the skin layer comprises:
a thermoplastic resin; and
an antistatic agent comprising 90% by weight or more and less than 100% by weight of a sulfonate salt, the main layer comprises:
a thermoplastic resin; and
an inorganic additive having an average particle size in a range of 20 μm or less, a thickness of the thermoplastic resin sheet is in a range from 0.1 mm to 3.0 mm,
a thickness of the skin layer is in a range from 15 to 35 μm,
each of the thermoplastic resin in the skin layer and the thermoplastic resin in the main layer is polyolefinic polymer, and
the inorganic additive contained in the main layer forms a projection shape on a surface of the skin layer so as to increase water repellency of the skin layer, the projection shape having been formed when the thermoplastic resin sheet is deep-drawn by the thermoforming.

5. The deep-drawn formed article according to claim 4, wherein a contact angle of a water droplet on the skin layer after deep drawing by the thermoforming is in a range of 90° or more.

6. The deep-drawn article according to claim 4, wherein the antistatic agent is present in the skin layer in an amount of 0.01 to 5.0 parts by weight per 100 parts by weight of the thermoplastic resin of the skin layer.

7. The deep-drawn article according to claim 4, wherein the polyolefinic polymer is a polypropylene-based polymer.

8. The deep-drawn article according to claim 4,
wherein the polyolefinic polymer is at least one polymer selected from the group consisting of polypropylene; a binary or more block, random, or graft copolymer made from more than half weight of propylene and one or more monomers selected from the group consisting of α-olefins other than propylene, a vinyl ester, an aromatic vinyl monomer, and a vinylsilane; and combinations thereof.

9. The deep-drawn article according to claim 4, wherein the sulfonate salt is a sodium sulfonate salt.

10. The deep-drawn article according to claim 4, wherein a thickness of the main layer is in a range from 0.1 mm to 2.0 mm.

* * * * *